United States Patent [19]
Falconer

[11] Patent Number: 5,442,661
[45] Date of Patent: Aug. 15, 1995

[54] PATH GAIN ESTIMATION IN A RECEIVER

[75] Inventor: David D. Falconer, Nepean, Canada

[73] Assignee: Motorola Inc., Schaumburg, Ill.

[21] Appl. No.: 106,250

[22] Filed: Aug. 13, 1993

[51] Int. Cl.⁶ .............................................. H04B 1/69
[52] U.S. Cl. .................................................... 375/205
[58] Field of Search ............................................. 375/1

[56] References Cited

U.S. PATENT DOCUMENTS

| | | | |
|---|---|---|---|
| 5,164,959 | 11/1992 | Cai et al. | 375/1 |
| 5,218,619 | 6/1993 | Dent | 375/1 |
| 5,237,586 | 8/1993 | Bottomley | 375/1 |
| 5,276,703 | 1/1994 | Budin et al. | 375/1 |
| 5,280,472 | 11/1994 | Gihhousen et al. | 375/1 |
| 5,305,349 | 4/1994 | Dent | 375/1 |

OTHER PUBLICATIONS

IEEE Transactions on Communications *Maximum Likelihood Carrier Phase Recovery for Linear Suppressed-Carrier Digital Data Modulations* vol. Com-34, No. 6, Jun. 1986 Author. Pooi Yuen Kam: pp. 522–527.

Proceedings of the IEEE *Introduction to Spread-Spectrum Antimultipath Techniques and Their Application to Urban Digital Radio* vol. 68, No. 3, Mar. 1980 Author: George L. Turin: pp. 328–353.

IEEE Transactions on Communications *Low-Overhead Symbol Timing and Carrier Recovery for TDMA Portable Radio Systems* vol. 38, No. 10, Oct. 1990 Author: Nelson R. Sollenberger and Justin C.-I. Chuang: pp. 1886–1892.

Primary Examiner—Salvatore Cangialosi
Attorney, Agent, or Firm—Richard A. Sonnentag; Raymond J. Warren

[57] ABSTRACT

A coherent RAKE receiver utilizes a "blind block" path gain estimation scheme, based on a maximum likelihood criterion, to estimate path gains in the receiver. It is "blind" in that preliminary hard decisions on coded bits (i.e., coded bits from the corrupt transmitted signal) are not used. Instead, a form of soft decisions are used. It is a "block" scheme in that the complex path gains are estimated for an isolated block, for example a block of B correlator outputs. The path gains varying with time are approximated to be linear in time such that the average path gain and the slope of the path gain per path can be utilized to estimate the path gain. The path gain estimation scheme overcomes the shortcomings of typical CDMA systems where there is no assurance of continuous transmission (except for full-rate 9600 b/s transmission) upon which to base a FIR filter-type prediction scheme.

10 Claims, 2 Drawing Sheets

HYPERBOLIC TANGENT FUNCTION tanh(x)

PATH GAIN ESTIMATION IN A RECEIVER

FIELD OF THE INVENTION

The invention relates generally to spread spectrum communication systems operating in the presence of multipaths and more particularly to estimates of path gain in receivers of such communication systems.

BACKGROUND OF THE INVENTION

Communication systems designed to incorporate the characteristic of communicating with many remote subscriber units for brief intervals on the same communication channel are termed multiple access communication systems. One type of communication system which can be a multiple access system is a spread spectrum system. In a spread spectrum system, a modulation technique is utilized in which a transmitted signal is spread over a wide frequency band within the communication channel. The frequency band is much wider than the minimum bandwidth required to transmit the information being sent. A voice signal, for example, can be sent with amplitude modulation (AM) in a bandwidth only twice that of the information itself. Other forms of modulation, such as low deviation frequency modulation (FM) or single sideband AM, also permit information to be transmitted in a bandwidth comparable to the bandwidth of the information itself. However, in a spread spectrum system, the modulation of a signal to be transmitted often includes taking a baseband signal (e.g., a voice channel) with a bandwidth of only a few kilohertz, and distributing the signal to be transmitted over a frequency band that may be many megahertz wide. This is accomplished by modulating the signal to be transmitted with the information to be sent and with a wideband encoding signal.

Generally, three types of spread spectrum communication techniques exist, including:

Direct Sequence

The modulation of a carrier by a digital code sequence whose bit rate is much higher than the information signal bandwidth. Such systems are referred to as "direct sequence" modulated systems.

Hopping

Carrier frequency shifting in discrete increments in a pattern dictated by a code sequence. These systems are called "frequency hoppers." The transmitter jumps from frequency to frequency within some predetermined set; the order of frequency usage is determined by a code sequence. Similarly "time hopping" and "time-frequency hopping" have times of transmission which are regulated by a code sequence.

Chirp

Pulse-FM or "chirp" modulation in which a carrier is swept over a wide band during a given pulse interval.

Information (i.e. the message signal) can be embedded in the spread spectrum signal by several methods. One method is to add the information to the spreading code before it is used for spreading modulation. This technique can be used in direct sequence and frequency hopping systems. It will be noted that the information being sent must be in a digital form prior to adding it to the spreading code, because the combination of the spreading code and the information, typically a binary code, involves module-2 addition. Alternatively, the information or message signal may be used to modulate a carrier before spreading it.

Thus, a spread spectrum system must have two properties: (1) the transmitted bandwidth should be much greater than the bandwidth or rate of the information being sent and (2) some function other than the information being sent is employed to determine the resulting modulated channel bandwidth. Spread spectrum communication systems can be implemented as multiple access systems in a number of different ways; one type of multiple access spread spectrum system being a direct sequence code division multiple access (DS-CDMA) system.

Multiple communication channels are allocated by assigning unique spreading code to each (and every) user in a shared frequency band. As a result, transmitted signals are in the same broad frequency band of the communication channel, but within unique portions of the broad frequency band assigned by the unique spreading codes. These unique spreading codes preferably are orthogonal to one another such that the cross-correlation between the spreading codes is approximately zero. Particular transmitted signals can be retrieved from the communication channel by despreading a signal representative of the sum of signals in the communication channel with a spreading code related to the particular transmitted signal which is to be retrieved from the communication channel. Further, when the spreading codes are orthogonal to one another, the received signal can be correlated with a particular spreading code such that only the desired signal related to the particular spreading code is enhanced while the other signals are not enhanced.

Spread spectrum, and other communication systems, are often subject to multipath distortion, in which several copies of a transmitted signal are received with different delays, gains and phases as a result of multiple radio path reflections. A type of receiver particularly well suited for reception of multipath spread spectrum signals is a RAKE receiver, which is well known in the art. The RAKE receiver is comprised of "fingers" which optimally combine the separate paths in the receiver. In general, the RAKE receiver can be analogized to a matched filter, where the path gains of each "finger," like the taps of a matched filter, need to be estimated to construct the RAKE receiver to accurately receive a transmitted signal. Since a transmitted signal is subject to many corruptions on its way to a receiver (multipath effects, Rayleigh fading, etc.), the receiver must estimate the path gains utilizing the corrupted transmitted signal. Clearly, the eventual received signal will only be as good as the path gain estimation per "finger" in the RAKE receiver.

Thus a need exists for a receiver, and particularly a RAKE receiver, that provides an accurate path gain estimate for each "finger" of the RAKE receiver without relying on the corrupt transmitted signal to make the estimate.

DETAILED DESCRIPTION OF A PREFERRED EMBODIMENT

Figure 1:
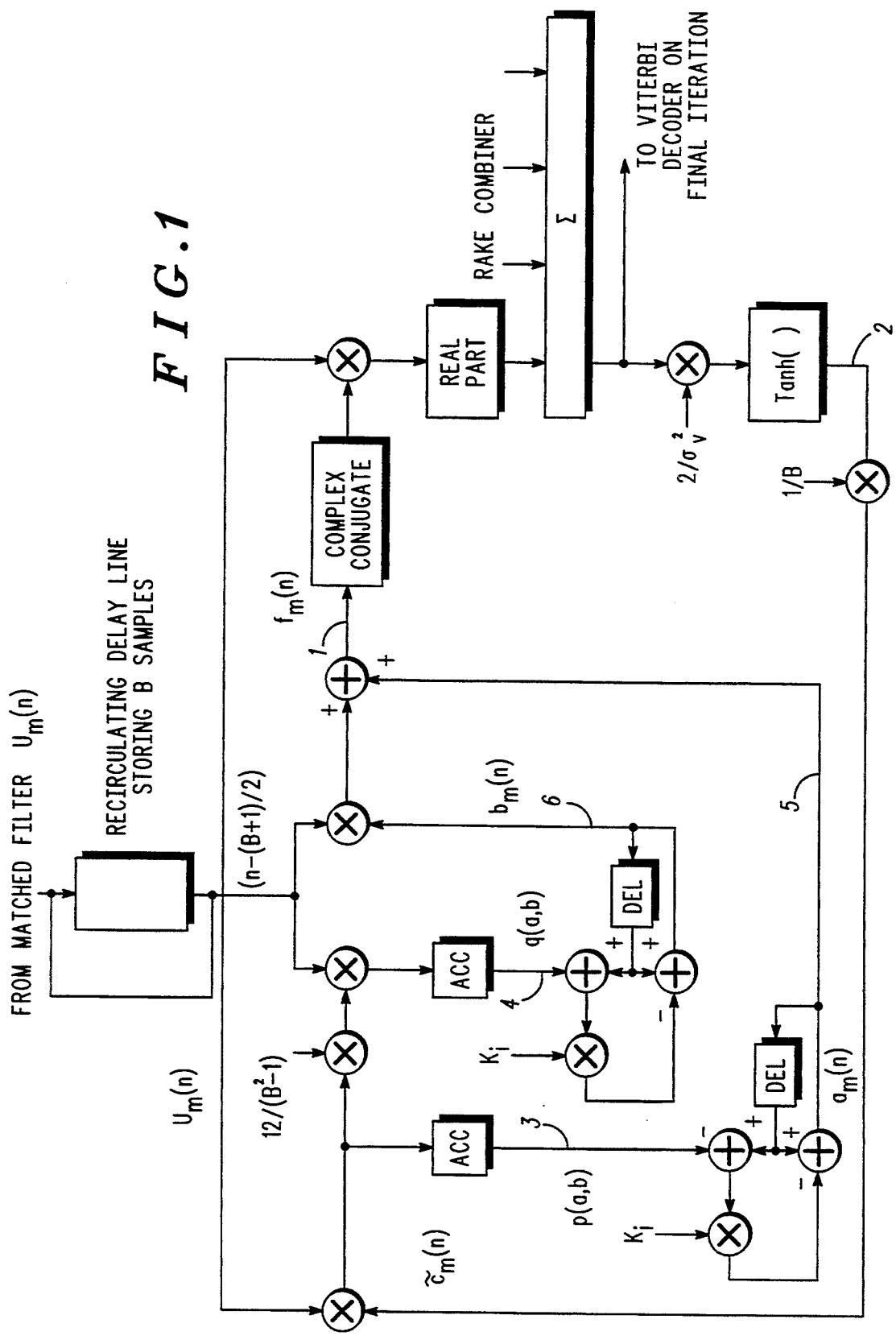
FIG. 1 generally depicts a portion of a coherent RAKE receiver which estimates path gain in accordance with the invention.

A "blind block" path gain estimation scheme, based on a maximum likelihood criterion, is described in accordance with the invention. It is "blind" in that preliminary hard decisions on coded bits (i.e., coded bits from the corrupt transmitted signal) are not used. Instead, a form of soft decisions are used. It is a "block" scheme in that the complex path gains are estimated for an isolated block, for example a block of B correlator outputs. In the preferred embodiment, the receiver which effectively utilizes the "blind block" path gain estimation scheme is a coherent RAKE receiver implemented in a code-division multiple access (CDMA) communication system. In an illustrative embodiment, blocks of data comprising B=36 coded bits lasting 1.25 ms are transmitted, separated from other blocks by pseudo-random time intervals. The "blind block" path gain estimation scheme overcomes the shortcomings of typical CDMA systems where there may be no assurance of continuous transmission upon which to base a FIR filter-type prediction scheme. One consequence of this, or any other estimation scheme not relying on knowledge of transmitted data symbols, is that there is phase ambiguity in the estimates. As a result, the data bits must be differentially encoded, and errors will tend to occur in pairs.

A coherent RAKE receiver requires accurate estimates of channel multipath components to do optimum combining in a coherent spread spectrum communication system. It processes the complex-valued outputs of correlators or matched filters $$u_m(n) = \frac{1}{2NTc} \int_0^{NTc} y(t)s(t - t_m)^* dt \qquad (1)$$

$$(m = 1, 2 \ldots L)$$

from L different multipath components or diversity antennas. Typically, L is 1 to 4. In equation (1), n is the time index, N is the number of CDMA chips per coded bit, Tc is the chip interval, y(t) is the complex received waveform containing the desired signal plus noise, s(t) is the CDMA spreading code for the desired signal, $t_m$ is the time delay of the mth path (assumed accurately estimated), and * means complex conjugate. Each sample $u_m(n)$ is then of the form $$u_m(n) = c(n)f_m(n) + v_m(n) \qquad (2)$$

where $c(n) = \pm 1$ is an unknown binary coded bit and $v_m(n)$ is a complex noise sample. The noise $v_m(n)$ actually includes interfering CDMA signals, thermal noise, and other multipath components at different path delays (the contribution of these other multipath components is expected to be small if the spreading sequence has low autocorrelation sidelobes and N is large).

The objective is to find an estimate $\{\hat{f}_m(n), m=1, 2 \ldots L, n=1, 2, \ldots B\}$ of the path gains, given a block of B successive correlator outputs $\{u_m(n), m=1,2 \ldots L, n=1,2, \ldots B\}$ for a given path delay. Once such an estimate is found, the RAKE receiver forms $$R(n) = Re\left[\sum_{m=1}^{L} \hat{f}_m(n)^* u_m(n)\right] \qquad (3)$$

which is then passed to a decoder for processing.

The L complex path gains $\hat{f}_m(n)$ can vary significantly with time, due to Doppler effects. Furthermore, co-channel interference will give rise to relatively high noise components in the $\{u_m(n)\}$. The estimates $\{\hat{f}_m(n)\}$ must be obtained from a block of B successive samples $u_m(n)$, where B is typically around 36, corresponding to a time duration of 1.25 ms in a representative CDMA system with a 9.6 kb/s data rate, and employing a rate $\frac{1}{3}$ binary code. Moreover they are to be obtained in the absence of knowledge or explicit estimates of the c(n) (i.e., without use of the corrupt transmitted signal).

A "blind block" estimation scheme can be derived and evaluated based on a maximum likelihood (ML) principle. FIG. 1 generally depicts a portion of a coherent RAKE receiver which estimates path gain in accordance with the invention. A block of B samples $u_m(n)$ is stored in a recirculating delay line or other memory device. What follows is a description of an iterative algorithm for processing this block to achieve the estimates $\{\hat{f}_m(n)$ for $m=1,2 \ldots L$ and $n=1,2 \ldots B\}$.

(1) Start with parameters $a_m(i)=1$, $b_m(i)=0$, $m=1, \ldots L$, $i=1$.

(2) Start the ith iteration, as shown by point 1 in FIG. 1, by approximating $\hat{f}_m(n)$ by $$\hat{f}_m(n,i) = a_m(i) + b_m(i)[n - (B+1)/2] \qquad (4)$$

$a_m(i)$ is the ith iteration estimate of the average value of $f_m(n)$ in the block and $b_m(i)$ is the ith iteration estimate of its rate of change (slope). The block duration is assumed short enough relative to the path time variation that it varies approximately linearly with time.

Figure 2:
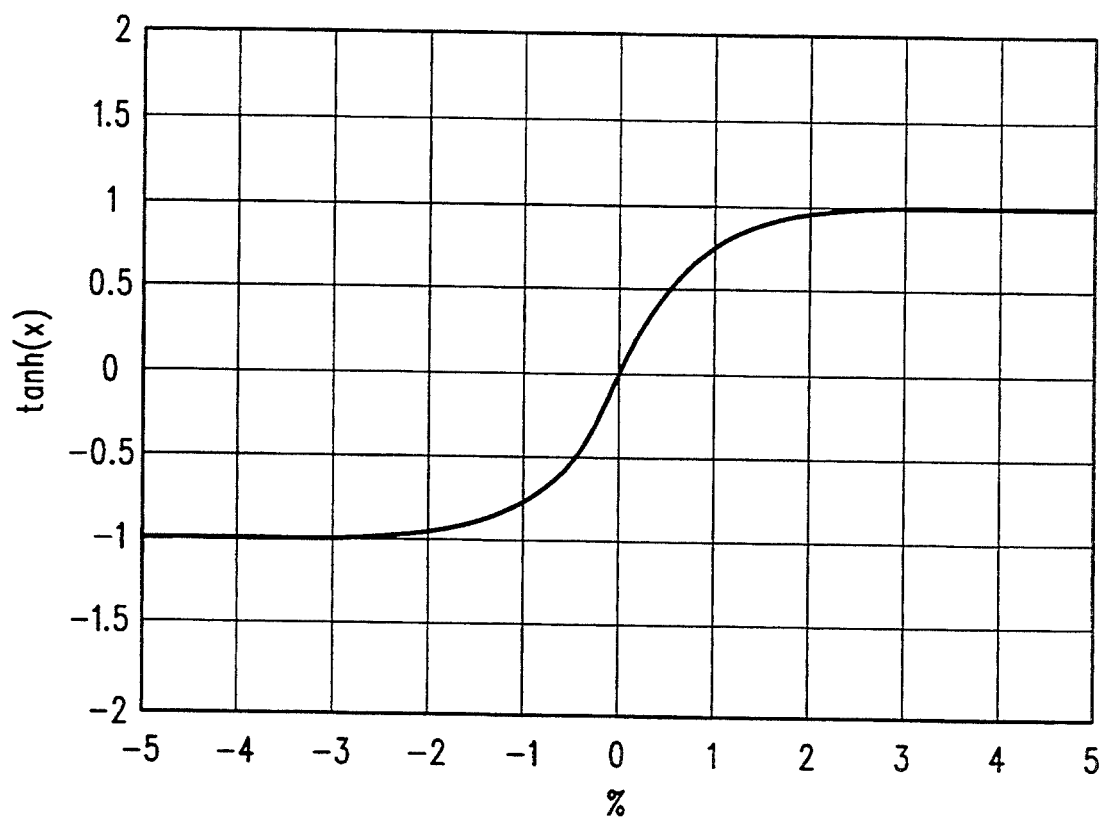
FIG. 2 depicts a hyperbolic tangent function tanh(x).

(3) Form a "soft decision" $\tilde{c}(n,i)$, as shown at point 2 of FIG. 1, as follows:

$$\tilde{c}(n,i) = \tanh\left\{\frac{2}{\sigma_v^2} \sum_{m=1}^{L} \hat{f}_m(n,i)^* u_m(n)\right\} \qquad (5)$$

where tanh(), as depicted in FIG. 2, is the hyperbolic tangent function that behaves like a saturating amplifier or soft limiter. The $\sigma_v^2/2$ is the receiver's estimate of the variance of the each of the real and imaginary parts of the complex noise samples.

(4) Multiply $\tilde{c}(n,i)$ by $(1/B)u_m(n)$, as shown at point 3 of FIG. 1, and accumulate to form $$p_m(a,b,i) = \frac{1}{B} \sum_{n=1}^{B} \tilde{c}(n,i)u_m(n)) \qquad (6)$$

(5) Multiply $\tilde{c}(n,i)$ by $(12/B(B^2-1))(n-(B+1)/2)u_m(n)$, as shown at point 4 of FIG. 1, and accumulate to form $$q_m(a,b,i) = \frac{12}{B(B^2 - 1)} \sum_{n=1}^{B} \tilde{c}(n,i)\left(n - \frac{B+1}{2}\right)u_m(n)) \qquad (7)$$

(6) Update $a_m(i)$ and $b_m(i)$ on the ith iteration, as shown at point 5 and 6 of FIG. I respectively, using a stochastic approximation algorithm:

$$a_m(n,i+1) = a_m(n,i) - k_i(a_m(n,i) - p_m(a,b)) \qquad (8a)$$

$$b_m(n,i+1) = b_m(n,i) - k_i(b_m(n,i) - q_m(a,b)) \qquad (8b)$$

where $k_i = i/(i+K)$, and $K$ is a suitable constant, such as $K = 20$.

(7) Increment $i$ by 1 and go back to step (2), until $i$ reaches a fixed count, such as $i = 30$.

When the iterations are completed the estimates $\{\hat{f}_m(n)\}$ are given by (4). Note that there will be a sign ambiguity ($\pm 1$) in this or any other estimation algorithm not making use of the true bits $\{c(n)\}$. Therefore differential encoding of the bits must be used. When the ith iteration has been completed, the entire block of B matched filter outputs $u_m(n)$ is processed, and corresponding soft decisions $\tilde{c}(n,i)$ are formed, to update $a_m(i)$ and $b_m(i)$.

Expressions for $a_m(i)$ and $b_m(i)$ are derived as follows. The path gain estimator is to determine $\hat{f}$, the vector representing the complex tap gains, given u, the vector which represents a sequence of B matched filter outputs. Thus, as stated above, maximum likelihood (ML)

$$\hat{f} = \arg \max \{p(u|\hat{f})\}$$

is chosen as the optimization criterion; i.e.

where $p(u|\hat{f})$ is the conditional probability density of u given $\hat{f}$.

The set of B c(n)'s which are contained in u are denoted by the vector c. The components of c are assumed to be $+1$ or $-1$ independently, and with equal probability. Then $$p(u|\hat{f}) = 2^{-B} \sum_c p(u|\hat{f},c) \quad (9)$$

where $$p(u|\hat{f},c) = \quad (10)$$

$$\frac{1}{(\pi\sigma_v^2)^B} \exp\left(\frac{1}{\sigma_v^2} \sum_{n=1}^{B} \sum_{m=1}^{L} |u_m(n) - c(n)\hat{f}_m(n)|^2\right)$$

The path gains $f_m(n)$ vary with time n due to doppler. For example, a doppler frequency of 85 Hz corresponds to a vehicle speed of about 60 m/h and a carrier frequency of about 900 Mhz. A block length B of 1.25 ms, then corresponds to about 11% of one doppler cycle. During this short time interval, it is reasonable to approximate the variation of $f_m(n)$ as being linear in n; i.e.

$$\hat{f}_m(n) = a_m + b_m\left(n - \frac{B+1}{2}\right) \quad (11)$$

where $a_m$ and $b_m$ are fixed parameters to be estimated; $a_m$ is the average path gain of the mth path in a block and $b_m$ is its rate of change, or slope. The quantity $(B+1)/2$ appearing in equation (11) was chosen so that the summation of the second term in (11) from 1 to B is zero. Note that the estimation problem now is to maximize $p(u|a,b)$ with respect to the vectors a and b which represent the $\{a_m\}$ and $\{b_m\}$.

Carrying out the averaging in (9) with respect to the independent random variables $\{c(n) = \pm 1\}$ we get $$p(u|a,b) = \exp\left(\frac{-1}{\sigma_v^2} \sum_{n=1}^{B} \left(\sum_{m=1}^{L} \left|a_m + b_m\left(n - \frac{B+1}{2}\right)\right|^2\right)\right) \quad (12)$$

$$\exp\left(\sum_{n=1}^{B} \ln \cosh\left\{\frac{2}{\sigma_v^2} \operatorname{Re} \sum_{m=1}^{L} u_m(n)^* \left(a_m + b_m\left(n - \frac{B+1}{2}\right)\right)\right\}\right)$$

To maximize $p(u|a,b)$ with respect to the a's and b's, we set the derivatives of $p(u|a,b)$ with respect to $a_m$ and $b_m$ equal to zero, to get $$a_m = \frac{1}{B} \sum_{n=1}^{B} u_m(n) \tanh\left\{\frac{2}{\sigma_v^2} \operatorname{Re} \sum_{m=1}^{L} u_m(n)^* \left(a_m + b_m\left(n - \frac{B+1}{2}\right)\right)\right\} \quad (13)$$

for $m = 1, 2, \ldots L$, and $$b_m = \frac{12}{B(B^2 - 1)} \sum_{n=1}^{B} \left(n - \frac{B+1}{2}\right) u_m(n) \tanh\left\{\frac{2}{\sigma_v^2} \operatorname{Re} \sum_{m=1}^{L} u_m(n)^* \left(a_m + b_m\left(n - \frac{B+1}{2}\right)\right)\right\} \quad (14)$$

for $m = 1, 2, \ldots L$.

The argument of the tanh function in (13) and (14) is the output of the RAKE path combiner for the path estimates given by (11). Note that for high signal-to-noise ratio (i.e. $\sigma_v^2$ approaching zero) the tanh function in (13) and (14) approaches the signum function $\pm 1$, and thus it would constitute a hard preliminary decision on c(n) based on RAKE receiver outputs. Expressions (13) and (14) can be interpreted as weighted averages of products of $u_m(n)$ and $$\left(n - \frac{B+1}{2}\right) u_m(n),$$

$u_m(n)$, respectively, with soft decisions (determined by the tanh function) on c(n). Note also that there will be a $\pm 1$ ambiguity in the estimates; thus as mentioned earlier, differential encoding of the data bits will be necessary.

Equations (13) and (14) are nonlinear equations which must be solved for $a_m$ and $b_m$. They may be rewritten as $$a - p(a,b) = 0 \quad (15)$$

$$b - q(a,b) = 0 \quad (16)$$

where p(a,b) and q(a,b) are L-dimensional vectors whose $m^{th}$ components are the right hand sides of (13)

and (14) respectively. These equations can be solved iteratively using stochastic approximation; i.e. on the ith iteration, $$a(i) = (1-k_i)a(i-1) + k_i p(a(i-1), b(i-1)) \qquad (17)$$

$$b(i) = (1-k_i)b(i-1) + k_i q(a(i-1), b(i-1)) \qquad (18)$$

where $k_i$ are decreasing step sizes; e.g. $k_i = 1/(i+1)$. Note that one solution of these equations is $a = b = 0$. However, analysis has revealed that this solution corresponds to a minimum of the likelihood function, and so there is no danger of a stochastic approximation algorithm, with a non-zero initial condition, converging to this solution.

The "blind block" path gain estimation scheme makes possible coherent BPSK coded modulation for a digital cellular CDMA communication system operating in a rapidly-fading, interference-limited environment. Simulations have shown roughly a 3 dB improvement over noncoherent orthogonal schemes which are utilized for the reverse channel of typical CDMA communication systems. Furthermore, the scheme does not rely on the existence of preliminary data decisions and is based on block-by-block transmission rather than continuous transmission. Also, the coherent mode of operation made possible by this scheme can be implemented with a single matched filter at the receiver matched to the appropriate spreading sequence. This would simplify synchronization, and facilitate rapid response to the sudden appearances and disappearances of multipath components associated with vehicle movement in urban environments.

While the invention has been particularly shown and described with reference to a particular embodiment, it will be understood by those skilled in the art that various changes in form and details may be made therein without departing from the spirit and scope of the invention. For example, in alternate embodiments, the scheme could include a monitor for the presence of weak paths, and when detected, they would be eliminated from further consideration. This can be done since it has been found that there is little value in including paths in equation (3) for which $f_m(n)$ is relatively small. Furthermore, the hyperbolic tangent function appearing in equation (5) and FIG. 2 could be approximated by a digital look-up table, implemented in a read only memory (ROM), or by a soft limiter device.

What I claim is:

1. A method of complex-valued path gain estimation in a receiver, the method comprising the steps of:

approximating the path gain as a function of average path gain and rate of change of path gain over a block of B samples;

generating the path gain estimation over the block of B samples utilizing the matched filter outputs and soft decisions made on data symbols related to the block of B samples;

modifying the generated path gain estimation by first and second factors to produce first and second adjustment factors; and modifying the average path gain utilizing the first adjustment factor and modifying the rate of change of path gain utilizing the second adjustment factor to produce an updated path gain approximation.

2. The method of claim 1 wherein the receiver is a coherent RAKE receiver.

3. The method of claim 2 wherein said step of generating a soft decision further comprises the step of generating a soft decision utilizing a hyperbolic tangent function.

4. The method of claim 2 wherein said step of generating, first step of modifying and second step of modifying are iterated to produce the path gain estimation.

5. The method of claim 4 wherein the path gain estimation is input to a coherent RAKE receiver for further processing.

6. A receiver for performing complex-valued path gain estimation, the receiver comprising:

means for approximating the path gain as a function of average path gain and rate of change of path gain over a block of B samples and generating the path gain estimation over the block of B samples utilizing the matched filter outputs and soft decisions made on data symbols related to the block of B samples; and means for modifying the generated path gain estimation by first and second factors to produce first and second adjustment factors and modifying the average path gain utilizing the first adjustment factor and modifying the rate of change of path gain utilizing the second adjustment factor to produce an updated path gain approximation.

7. The receiver of claim 6 wherein the receiver further comprises a coherent RAKE receiver.

8. The receiver of claim 7 wherein said means for generating a soft decision further comprises means for generating a soft decision utilizing a hyperbolic tangent function.

9. The receiver of claim 7 wherein said means for generating and said means for modifying iterate to produce the path gain estimation.

10. The receiver of claim 9 wherein the path gain estimation is input to a coherent RAKE receiver for further processing.

* * * * *